(12) United States Patent
Nair et al.

(10) Patent No.: US 11,379,955 B2
(45) Date of Patent: Jul. 5, 2022

(54) ELECTRONIC DEVICE, IMAGE PROCESSING METHOD THEREOF, AND COMPUTER-READABLE RECORDING MEDIUM

(71) Applicant: SAMSUNG ELECTRONICS CO., LTD., Suwon-si (KR)

(72) Inventors: Tejas Nair, Suwon-si (KR); Jaesung Lee, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/971,601

(22) PCT Filed: Feb. 20, 2019

(86) PCT No.: PCT/KR2019/002022
§ 371 (c)(1),
(2) Date: Aug. 20, 2020

(87) PCT Pub. No.: WO2019/164232
PCT Pub. Date: Aug. 29, 2019

(65) Prior Publication Data
US 2020/0388011 A1  Dec. 10, 2020

(30) Foreign Application Priority Data
Feb. 20, 2018  (KR) ........................ 10-2018-0019973

(51) Int. Cl.
*G06T 5/00*  (2006.01)
*G06N 3/08*  (2006.01)
(Continued)

(52) U.S. Cl.
CPC ............. *G06T 5/002* (2013.01); *G06N 3/084* (2013.01); *G06T 5/009* (2013.01); *G06T 5/50* (2013.01);
(Continued)

(58) Field of Classification Search
CPC .......... G06T 5/002; G06T 5/009; G06T 5/50; G06T 5/007; G06T 5/006; G06T 5/008;
(Continued)

(56) References Cited

U.S. PATENT DOCUMENTS

| 7,180,629 B1 | 2/2007 | Nishio et al. |
| 8,488,020 B2 | 7/2013 | Bok et al. |

(Continued)

FOREIGN PATENT DOCUMENTS

| JP | 6-348840 A | 12/1994 |
| JP | 2000-311243 A | 11/2000 |

(Continued)

OTHER PUBLICATIONS

Shin, et al., "The correction of Lens distortion based on Image division using Artificial Neural Network", Apr. 2009, Journal of the Korea Society of Computer and Information, vol. 14, Issue No. 4, 8 pages total.

(Continued)

*Primary Examiner* — Jose L Couso
(74) *Attorney, Agent, or Firm* — Sughrue Mion, PLLC

(57) ABSTRACT

The present disclosure relates to an artificial intelligence (AI) system utilizing a machine learning algorithm, including deep learning and the like, and application thereof. In particular, an electronic device of the present disclosure comprises: a memory including at least one command; and a processor connected to the memory so as to control the electronic device, wherein, by executing the at least one command, the processor acquires an image, acquires a noise (Continued)

correction map for correction of noise of the image on the basis of configuration information of a camera having captured the image or brightness information of the image, and eliminates the noise of the image through the noise correction map. In particular, at least a part of an image processing method may use an artificial intelligence model having been acquired through learning according to at least one of a machine learning algorithm, a neural network algorithm, and a deep learning algorithm.

15 Claims, 12 Drawing Sheets

(51) Int. Cl.
*G06T 5/50* (2006.01)
*H04N 5/235* (2006.01)

(52) U.S. Cl.
CPC . *H04N 5/2351* (2013.01); *G06T 2207/20021* (2013.01); *G06T 2207/20081* (2013.01); *G06T 2207/20084* (2013.01)

(58) Field of Classification Search
CPC .. G06T 5/20; G06T 5/001; G06T 5/30; G06T 7/00; G06T 7/85; G06T 2207/20021; G06T 2207/20081; G06T 2207/20084; G06T 2207/10004; G06T 2207/10024; G06T 2207/10144; G06T 2207/20221; G06T 2207/10016; G06T 2207/20032; G06T 2207/20076; G06T 2207/20182; G06T 2207/20192; G06N 3/0454; G06N 3/08–088; G06N 5/00; G06N 20/00; G06K 7/10851; G06K 9/40; G06K 9/44; G06K 9/54; G06K 9/56; G06K 9/60; G06K 9/605; H04N 5/2351; H04N 5/3651; H04N 5/3572; H04N 5/907; H04N 5/208; H04N 5/21; H04N 5/2355; H04N 5/2322; G09G 2320/0233; G09G 2320/029; G09G 2320/0626; G06V 10/20; G06V 10/30; G06V 10/34; G06V 10/36

See application file for complete search history.

(56) References Cited

U.S. PATENT DOCUMENTS

| | | | |
|---|---|---|---|
| 9,633,274 B2 | 4/2017 | Tuzel et al. | |
| 10,319,086 B2 | 6/2019 | Lee et al. | |
| 10,445,402 B1* | 10/2019 | Wang | G06N 3/0454 |
| 2006/0262147 A1* | 11/2006 | Kimpe | G09G 3/20 |
| | | | 345/690 |
| 2010/0254624 A1 | 10/2010 | Lee et al. | |
| 2010/0309345 A1* | 12/2010 | Zimmer | H04N 9/04517 |
| | | | 348/242 |
| 2011/0150357 A1* | 6/2011 | Prentice | H04N 5/2355 |
| | | | 382/274 |
| 2013/0242144 A1 | 9/2013 | Ovsiannikov | |
| 2014/0267833 A1* | 9/2014 | Chen | G06T 5/003 |
| | | | 348/239 |
| 2015/0070537 A1* | 3/2015 | Bai | H04N 1/60 |
| | | | 348/251 |
| 2016/0171727 A1 | 6/2016 | Bouchard et al. | |
| 2016/0344945 A1* | 11/2016 | Kano | G06T 3/4069 |
| 2017/0278546 A1* | 9/2017 | Xiao | G11B 27/34 |
| 2018/0259743 A1* | 9/2018 | Sasaki | H04N 5/23212 |
| 2019/0080666 A1* | 3/2019 | Chappalli | G09G 3/006 |
| 2020/0267339 A1* | 8/2020 | Douady-Pleven | G06T 3/0093 |

FOREIGN PATENT DOCUMENTS

| | | |
|---|---|---|
| JP | 2013-187645 A | 9/2013 |
| KR | 10-2010-0110121 A | 10/2010 |
| KR | 10-1544741 B1 | 8/2015 |
| KR | 10-2017-0019827 A | 2/2017 |

OTHER PUBLICATIONS

Zhang, et al., "Beyond a Gaussian Denoiser: Residual Learning of Deep CNN for Image Denoising", Jul. 2017, IEEE Transactions on Image Processing, vol. 26, Issue No. 7, 14 pages total.
Gharbi, et al., "Deep Joint Demosaicking and Denoising", Nov. 2016, 12 pages total.
International Search Report (PCT/ISA/210) dated Jun. 11, 2019, issued by the International Searching Authority in International Application No. PCT/KR2019/002022.
Written Opinion (PCT/ISA/237) dated Jun. 11, 2019, issued by the International Searching Authority in International Application No. PCT/KR2019/002022.
Communication dated Feb. 9, 2021, issued by the European Patent Office in European Application No. 19756967.6.
Tejas Nair et al., "Adaptive image denoising using a deep neural network with a noise correction map", Proceedings of Spie, Aug. 21, 2020, vol. 11510, pp. 115100P-1-115100P-9.
J. Dehos et al., "Practical photoquantity measurement using a camera", IET Image Processing, Jun. 2021, vol. 6, No. 4, pp. 417-425.
Kai Zhang et al., "FFDNet: Toward a Fast and Flexible Solution for CNN based Image Denoising", Arxiv.Org, Oct. 11, 2017, pp. 1-13.
Communication dated Jan. 24, 2022 issued by the Korean Intellectual Property Office in Korean English Application No. 10-2018-0019973.

* cited by examiner

FIG. 9
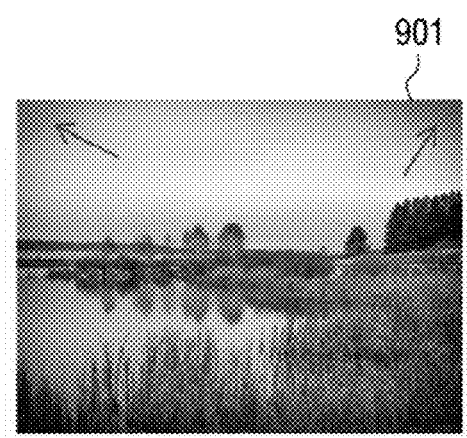
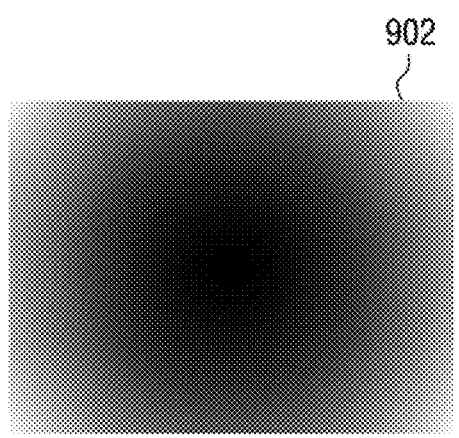
(a)  (b)

(a)           (b)           (c)

ELECTRONIC DEVICE, IMAGE PROCESSING METHOD THEREOF, AND COMPUTER-READABLE RECORDING MEDIUM

TECHNICAL FIELD

The disclosure relates to an electronic device, an imaging processing method thereof, and a computer-readable recording medium, and more particularly, to an electronic device that removes noise using brightness information of an image, an imaging processing method thereof, and a computer-readable recording medium.

The disclosure also relates to an artificial intelligence (AI) system simulating a recognition function, a decision function, or the like of a human brain using a machine learning algorithm, and an application thereof.

BACKGROUND ART

Recently, an artificial intelligence system implementing human-level intelligence has been used in various fields. The artificial intelligence system is a system in which a machine performs learning and decision and becomes smart by itself unlike an existing rule-based smart system. As the artificial intelligence system is more used, a recognition rate is improved and a user's taste may be more accurately understood. Therefore, the existing rule-based smart system has been gradually replaced by a deep learning-based artificial intelligence system.

An artificial intelligence technology consists of machine learning (for example, deep learning) and element technologies using the machine learning.

The machine learning is an algorithm technology of classifying/learning features of input data by itself, and the element technology is a technology of simulating functions such as recognition, decision, and the like, of a human brain using a machine learning algorithm such as deep learning, or the like, and consists of technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages/characters, and includes natural language processing, machine translation, a dialogue system, question and answer, voice recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of performing logical inference and prediction by deciding information, and includes knowledge/probability-based inference, optimization prediction, preference-based planning, recommendation, and the like. The knowledge representation is a technology of automating and processing human experience information as knowledge data, and includes knowledge construction (data creation/classification), knowledge management (data utilization), and the like. The motion control is a technology of controlling self-driving of a vehicle and a motion of a robot, and includes a motion control (navigation, collision, driving), a manipulation control (behavior control), and the like.

Meanwhile, recently, due to the popularization of a digital camera, restrictions of a time and a place in generating a still image or a moving image have decreased. In addition, with the development of an image technology, it has become possible for ordinary persons who are not experts to easily obtain high-definition images.

Nevertheless, there was a problem that an image generated in a dark surrounding environment such as an evening time or a closed space includes a large amount of noise, such that image quality is reduced.

To solve such a problem, conventionally, noise of an image has been measured and filtering has been performed for each intensity of the noise to remove the noise. In this case, the noise has been measured by analyzing a frequency of the image, and thus, a local feature of the image has not been considered. For example, there were many situations where it is unclear whether any portion in the image is an edge or noise existing in the image. Therefore, a problem that a blur region exists by filtering a region that is not noise in a compensated image and a texture of the image is lost, such that image quality is reduced has occurred.

In addition, in the related art for removing noise using an artificial intelligence model, a separate model has been used for each intensity of the measured noise. In this case, each of a plurality of models prepared for each intensity of the noise should be trained, and thus, there was a problem that many input data and memories are consumed for training.

DISCLOSURE

Technical Problem

The disclosure provides an electronic device that removes noise using brightness information of an image, an imaging processing method thereof, and a computer-readable recording medium.

Technical Solution

According to an embodiment of the disclosure, an electronic device includes: a memory including at least one command; and a processor connected to the memory and configured to control the electronic device, wherein the processor, when executing the at least one command, is configured to obtain an image, obtain a noise compensation map for compensating for noise of the image based on setting information of a camera capturing the image or brightness information of the image, and remove the noise of the image through the noise compensation map.

In this case, the processor may be configured to obtain the noise compensation map so that a noise removal intensity becomes high in a region in which brightness is low, based on the brightness information of the image.

In this case, the brightness information of the image may be light and shade information for each pixel of the image, and the processor may be configured to obtain the noise compensation map so that the noise removal intensity varies for each pixel.

Meanwhile, the processor may be configured to divide the image into a plurality of regions for each brightness and obtain the noise compensation map so that the noise removal intensity varies for each divided region.

Meanwhile, the setting information of the camera may include at least one of lens information of the camera or ISO information of the camera.

In this case, the processor may be configured to obtain the noise compensation map so that a noise removal intensity varies according to a vignetting compensation degree, based on the lens information of the camera.

Meanwhile, the processor may be configured to obtain the noise compensation map so that the higher the ISO value, the higher the noise removal intensity, based on the ISO information.

Meanwhile, the processor may be configured to input the noise compensation map and the image to a learned artificial intelligence model to obtain a compensated image in which the noise is removed.

According to another embodiment of the disclosure, an image processing method of an electronic device includes: obtaining an image; obtaining a noise compensation map for compensating for noise of the image based on setting information of a camera capturing the image or brightness information of the image; and removing the noise of the image through the noise compensation map.

In this case, in the obtaining of the noise compensation map, the noise compensation map may be obtained so that a noise removal intensity becomes high in a region in which brightness is low, based on the brightness information of the image.

In this case, the brightness information of the image may be light and shade information for each pixel of the image, and in the obtaining of the noise compensation map, the noise compensation map may be obtained so that the noise removal intensity varies for each pixel.

In this case, in the obtaining of the noise compensation map, the image may be divided into a plurality of regions for each brightness and the noise compensation map may be obtained so that the noise removal intensity varies for each divided region.

Meanwhile, the setting information of the camera may include at least one of lens information of the camera or ISO information of the camera.

In this case, in the obtaining of the noise compensation map, the noise compensation map may be obtained so that a noise removal intensity varies according to a vignetting compensation degree, based on the lens information of the camera.

Meanwhile, in the obtaining of the noise compensation map, the noise compensation map may be obtained so that the higher the ISO value, the higher the noise removal intensity, based on the ISO information.

Meanwhile, in the removing of the noise, the noise compensation map and the image may be input to a learned artificial intelligence model to obtain a compensated image in which the noise is removed.

According to still another embodiment of the disclosure, a computer-readable medium recording medium includes a program for executing an image processing method, wherein the image processing method includes: obtaining an image; obtaining a noise compensation map for compensating for noise of the image based on setting information of a camera capturing the image or brightness information of the image; and removing the noise of the image through the noise compensation map.

DESCRIPTION OF DRAWINGS

FIG. 9 is a view for describing an embodiment of a noise compensation map obtained by reflecting setting information of a camera;

BEST MODE

Figure 1:
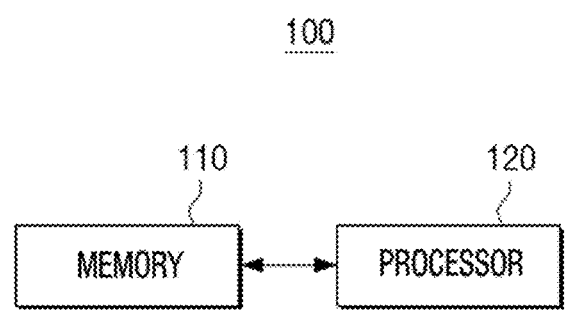
FIG. 1 is a block diagram for describing a schematic configuration of an electronic device according to an embodiment of the disclosure.

After terms used in the specification are schematically described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined based on the meaning of the terms and the contents throughout the disclosure rather than simple names of the terms.

Because the disclosure may be variously modified and have several embodiments, specific embodiments of the disclosure will be illustrated in the drawings and be described in detail in a detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments of the disclosure, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Hereinafter, the disclosure will be described in more detail with reference to the accompanying drawings.

FIG. 1 is a block diagram for describing a schematic configuration of an electronic device according to an embodiment of the disclosure.

Referring to FIG. 1, an electronic device 100 according to an embodiment of the disclosure includes a memory 110 and a processor 120.

The electronic device 100 may be a device capable of processing an image. For example, the electronic device 100 may be a desktop personal computer (PC), a laptop computer, a television (TV), a smartphone, a tablet PC, a server, a camera, a camcorder, or the like. Alternatively, the electronic device 100 may be a system itself in which a cloud computing environment is configured. In addition, the electronic device 100 may be a device capable of artificial intelligence learning.

A learned artificial intelligence model in the disclosure may be configured in consideration of an application field of a recognition model, computer performance of a device, or the like. For example, the artificial intelligence model may be learned to obtain information on an object included in a moving image by inputting moving image data. The learned artificial intelligence model may be, for example, a model based on a neural network. The recognition model may be designed to simulate a human brain structure on a computer, and may include a plurality of network nodes simulating neurons of a human neural network and having weights. The plurality of network nodes may form a connection relationship thereamong to simulate synaptic activity of the neurons transmitting and receiving signals through synapses. In this case, the artificial intelligence model may be a deep neural network (DNN), but this is only an example, and another artificial intelligence model may be used.

In addition, the electronic device 100 may use an artificial intelligence agent to search for the information related to the object as described above. In this case, the artificial intelligence agent is a dedicated program for providing an artificial intelligence (AI) based service (for example, a speech recognition service, a secretary service, a translation service, a search service, or the like), and may be executed by an existing general-purpose processor (for example, a central processing unit (CPU)) or a separate AI dedicated processor (for example, a graphics processing unit (GPU), or the like).

The memory 110 may be implemented by a memory of various formats such as a hard disk drive (HDD), a solid state drive (SSD), a dynamic random access memory (DRAM), a static random access memory (SRAM), a ferroelectrics random access memory (FRAM), a flash memory, or the like.

Specifically, the memory 110 may store various programs and data required for an operation of the electronic device 100. For example, at least one command required for the operation of the electronic device 100 may be stored in the memory 110.

In addition, an artificial intelligence model may be stored in the memory 110. Here, the artificial intelligence model may be a learned model. In addition, the artificial intelligence model may remove noise of an input image. Specifically, the artificial intelligence model may receive the image and a noise compensation map obtained by the processor 120 and remove noise of the obtained image. Here, the image input to the artificial intelligence model may be a noise image obtained based on a high-definition original image, and parameters of the artificial intelligence model may be trained so that an image in which the noise is removed and the high-definition original image coincide with each other.

The processor 120 may generally control an operation of the electronic device 100 by executing at least one command stored in the memory 110.

According to an embodiment, the processor 120 may be implemented by a digital signal processor (DSP), a microprocessor, or a time controller (ICON). However, the processor 120 is not limited thereto, but may include one or more of a central processing unit (CPU), a micro controller unit (MCU), a micro processing unit (MPU), a controller, an application processor (AP), a communication processor (CP), and an ARM processor, or may be defined by these terms. In addition, the processor 140 may be implemented by a system-on-chip (SoC) or a large scale integration (LSI) in which a processing algorithm is embedded or may be implemented in a field programmable gate array (FPGA) form.

The processor 120 may obtain an image and may remove noise of the obtained image. In this case, the image may be obtained by a camera (not illustrated) included in the electronic device 100 or may be received from an external device.

Specifically, the processor 120 may obtain a noise compensation map for compensating for noise of the image, and may remove the noise of the image using the obtained noise compensation map. In this case, the noise compensation map may be obtained based on at least one of setting information of a camera capturing the obtained image or brightness information of the obtained image.

Specifically, the processor 120 may obtain the noise compensation map so that a noise removal intensity becomes high in a region in which brightness is low, based on the brightness information of the obtained image. Even though conditions other than the brightness of the image are the same as each other, the lower the brightness of the image, the more the generated noise. Therefore, the noise compensation map is generated so that the lower the brightness of the image, the higher the noise removal intensity. Here, the noise removal intensity may refer to an intensity at which a noise removal effect is applied.

Specifically, the processor 120 may obtain the brightness information of the image. In this case, the brightness information of the image may refer to light and shade information of the image. The processor 120 may obtain a gray map including the light and shade information of the obtained image and obtain the noise compensation map using the gray map. In this case, the light and shade information of the image is different for each image, and the processor 120 may thus generate the corresponding noise compensation map for each obtained image.

As an embodiment, the processor 120 may obtain light and shade information for each pixel of the image, and obtain the noise compensation map so that the noise removal intensity varies for each pixel.

As another embodiment, the processor 120 may divide the image into a plurality of regions, and obtain the noise compensation map so that the noise removal intensity varies for each divided region. Specifically, the processor 120 may divide the image into a plurality of regions for each brightness. For example, the processor 120 may detect an edge within the image and divide the image into the plurality of regions on the basis of the detected edge. Here, the edge may refer to a boundary at which a difference in light and shade within the image is a predetermined value or more.

Meanwhile, the processor 120 may obtain the noise compensation map using the setting information of the camera. Here, the camera is a device capturing the obtained image, and the setting information of the camera may include various items related to the brightness information of the obtained image. For example, the setting information of the camera may include at least one of lens information of the camera or ISO information of the camera.

Specifically, the processor 120 may obtain the noise compensation map so that the noise removal intensity varies according to a vignetting compensation degree, based on the lens information of the camera. Here, vignetting may refer to a phenomenon in which corners or outer portions of a captured image become dark or are covered with black due to a decrease in an amount of light of a lens peripheral portion. The vignetting is a problem of the lens itself, and an occurrence range and degree of the vignetting may vary for each lens used in the camera. Meanwhile, unless the lens of the camera is replaced, the noise compensation map based on the lens information may be the same. An embodiment of a compensating for the vignetting will be described in detail below with reference to FIGS. 8 and 9.

In addition, the processor 120 may obtain the noise compensation map based on the ISO information of the camera. Here, ISO refers to a degree of sensitivity of the camera to light, and because the camera recognizes weak light well as an ISO value of the camera becomes larger, the camera is mainly used for capturing an image in a dark place. When the ISO value is large, an image capturing time is shortened to obtain a clear image that does not shake, but there is a problem that the image becomes rough due to an increase in noise.

Such an ISO value may be designated by a user, but may also be automatically set based on sensed ambient brightness.

That is, when the ambient brightness at the time of capturing the image is low, noise increases in the captured image, and a noise compensation map with a high noise removal intensity is thus required, and the processor 120 may obtain a noise compensation map so that the higher the ISO value, the higher the noise removal intensity, based on ISO information in which brightness information is reflected.

Figure 3:
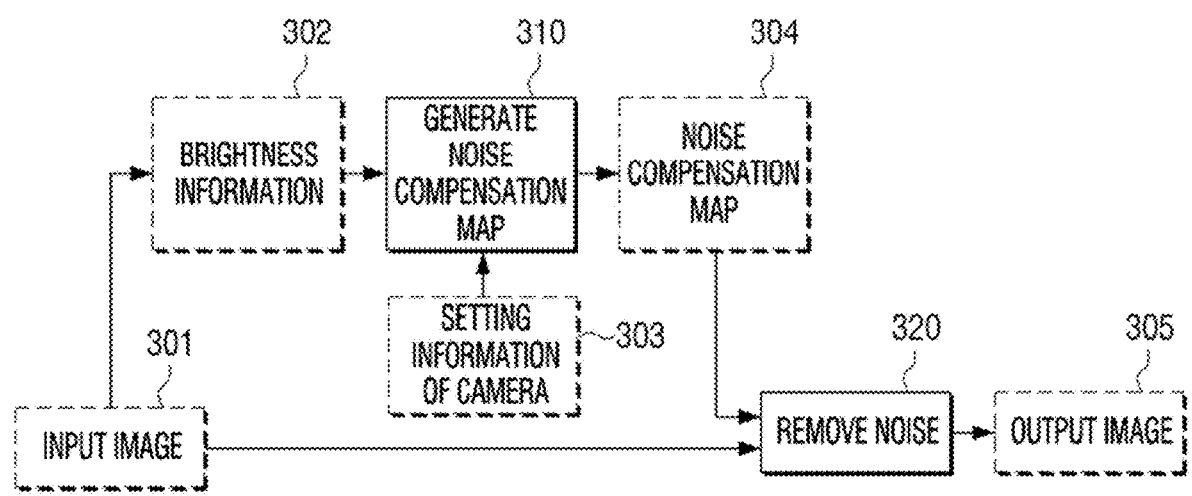
FIGS. 3 to 5 are views for describing a noise compensation process according to diverse embodiments of the disclosure.
Figure 8:
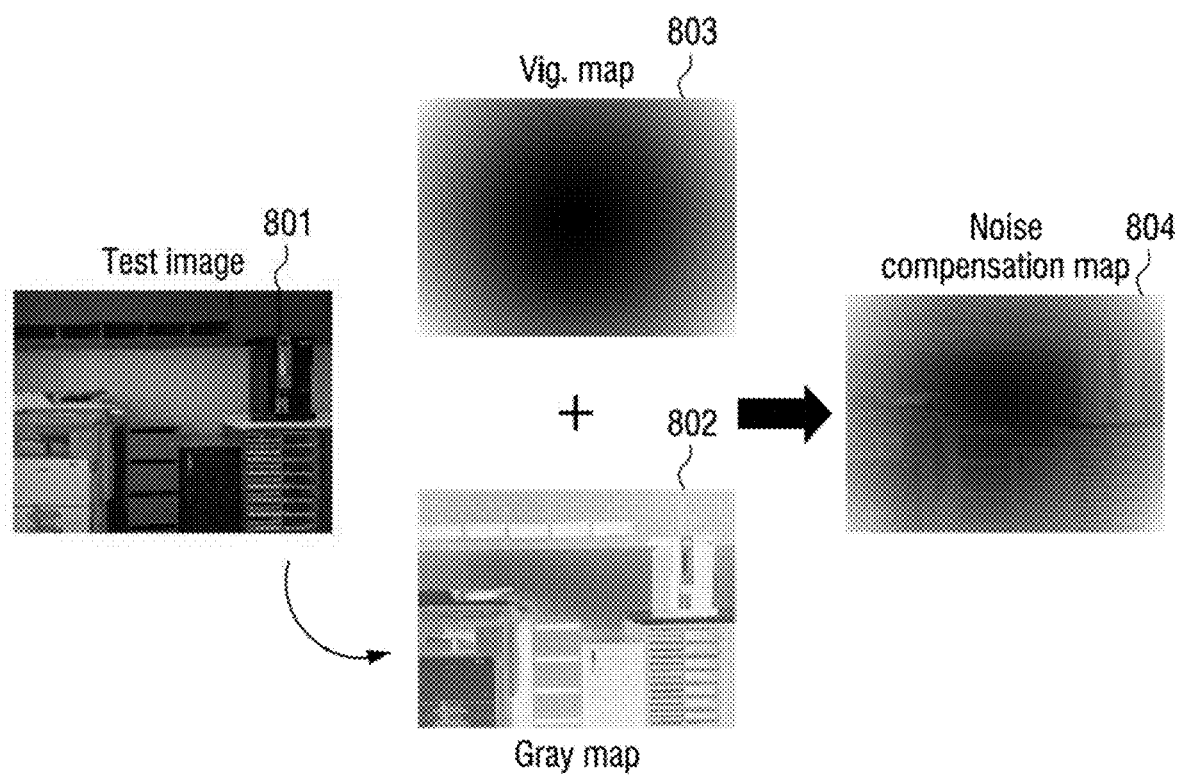
FIG. 8 is a view for explaining a process of obtaining a noise compensation map according to an embodiment of the disclosure.

It has been described hereinabove that each of the light and shade information of the image, the lens information of the camera, and the ISO information of the camera is used to obtain the noise compensation map, but at the time of actual implementation, as illustrated in FIGS. 3 and 8, a noise compensation map in which both of a map acquired based on the setting information of the camera and a gray map of the image are reflected may be obtained. Further, in addition to the setting information of the camera and the light and shade information of the image, various data such as a value sensed by an illuminance sensor may be reflected.

Meanwhile, the processor 120 may output an image in which noise is removed using the artificial intelligence model stored in the memory 110. Specifically, the processor 120 may input the obtained image and the obtained noise compensation map to the artificial intelligence model to obtain a compensated image in which noise is removed.

Meanwhile, the artificial intelligence model may be a model learned in advance. Specifically, the obtained image may be a noise image generated from the high-definition original image. In this case, the processor 120 may generate a noise compensation map of the noise image, input the noise image and the noise compensation map into the artificial intelligence model, and output the compensated image. In addition, the processor 120 may compare the output compensated image and the high-definition original image with each other to train parameters of the artificial intelligence model. Such a training operation may be performed in or before a process of manufacturing the electronic device 100, and the manufactured electronic device 100 may include an artificial intelligence model using the trained parameters. Diverse embodiments including an artificial intelligence model will be described in detail below with reference to FIGS. 4 and 5.

As described above, according to the disclosure, the noise of the image may be removed without directly measuring the noise of the image, and the noise may be more efficiently removed without loss of a texture by reflecting both of the entire and local features of the image.

Figure 2:
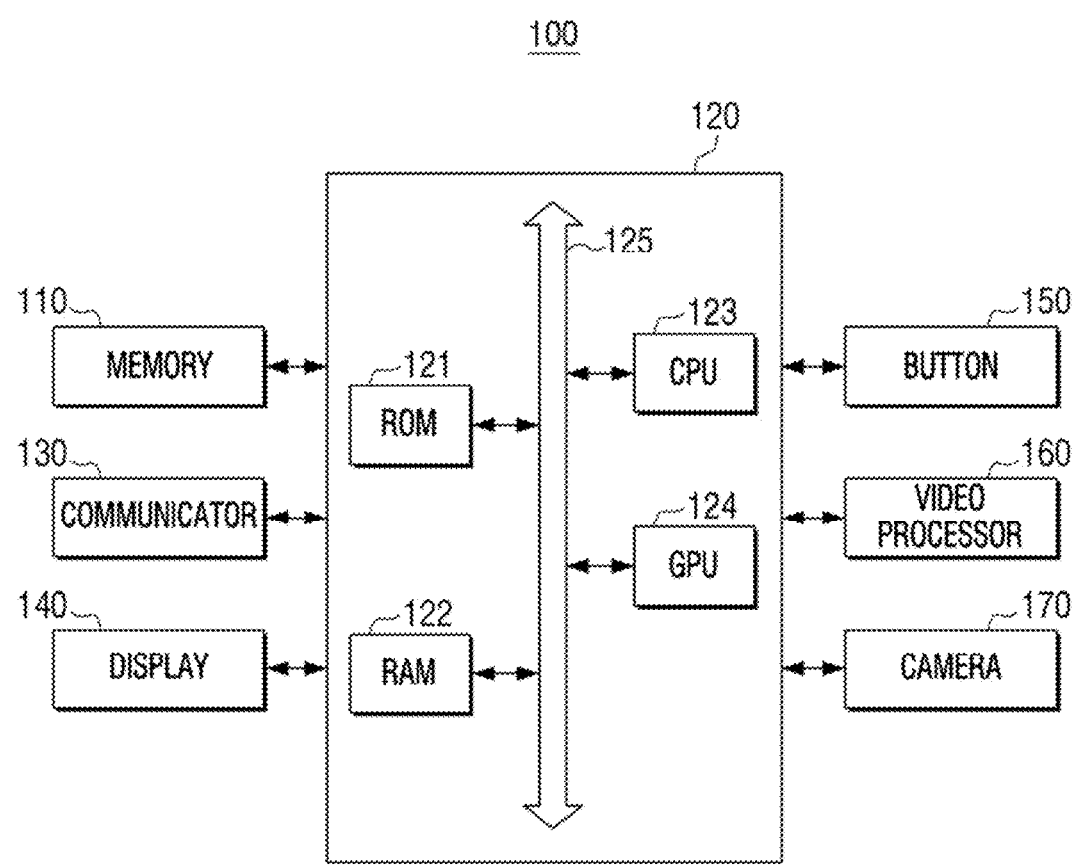
FIG. 2 is a block diagram for describing a detailed configuration of the electronic device of FIG. 1.

FIG. 2 is a block diagram for describing a detailed configuration of the electronic device of FIG. 1.

Referring to FIG. 2, the electronic device 100 may include a memory 110, a processor 120, a communicator 130, a display 140, a button 150, a video processor 160, and a camera 170. Here, the memory 110 and the processor 120 are the same as those illustrated in FIG. 1, and an overlapping description thereof will thus be omitted.

First, the processor 120 may include a random access memory (RAM) 121, a read only memory (ROM) 122, a central processing unit (CPU) 123, a graphic processing unit (GPU) 124, and a bus 125. The RAM 121, the ROM 122, the CPU 123, the GPU 124, and the like may be connected to each other through the bus 125.

The CPU 123 accesses the memory 110 to perform booting using an operating system (O/S) stored in the memory 110. In addition, the CPU 123 performs various operations using various programs, contents, data, and the like, stored in the memory 110.

An instruction set for booting a system, or the like, is stored in the ROM 122. When a turn-on command is input to supply power to the CPU 123, the CPU 123 copies the operating system (O/S) stored in the memory 110 to the RAM 121 according to an instruction stored in the ROM 122, and executes the O/S to boot the system. When the booting is completed, the CPU 123 copies various programs stored in the memory 110 to the RAM 121, and executes the programs copied to the RAM 121 to perform various operations.

The GPU 124 displays a user interface (UI) on the display 140 when the booting of the electronic device 100 is completed. In detail, the GPU 124 may render a screen including various objects such as an icon, an image, a text, and the like, using a calculator (not illustrated) and a renderer (not illustrated). The calculator calculates attribute values such as coordinate values at which the respective objects will be displayed, forms, sizes, colors, and the like, of the respective objects according to a layout of a screen. The renderer renders screens of various layouts including objects based on the attribute values calculated in the calculator. The screens (or user interface windows) rendered in the renderer are provided to the display 140 and are displayed on a main display region and a sub display region, respectively.

The communicator 130 is a component performing communication with various types of external devices according to various types of communication manners. Specifically, the communicator 130 may receive an image to be processed, from an external device. In addition, the communicator 130 may receive setting information of a camera capturing an image. Specifically, the communicator 130 may receive at least one of lens information or ISO information of the camera. Meanwhile, the communicator 130 may receive a value sensed by an external illuminance sensor. In addition, the communicator 130 may transmit an image in which noise is removed to the external device.

Specifically, the communicator 130 may receive the image from the external device through a wired manner such as an antenna, a cable, or a port, or may receive the image through a wireless manner such as wireless fidelity (Wi-Fi) or Bluetooth. Meanwhile, at the time of actual implementation, the electronic device 100 may receive an image selected by the user among a plurality of images stored in the memory 110 included in the electronic device 100 and process the received image.

In a case where the electronic device 100 is capable of wireless communication, the communicator 130 may include a Wi-Fi chip, a Bluetooth chip, a wireless communication chip, and a near field communication (NFC) chip. Specifically, the Wi-Fi chip and the Bluetooth chip perform communication in a Wi-Fi manner and a Bluetooth manner, respectively. In a case of using the Wi-Fi chip or the Bluetooth chip, various connection information such as a service set identifier (SSID), a session key, and the like, is first transmitted and received, communication is connected using the connection information, and various information may then be transmitted and received. The wireless communication chip refers to a chip performing communication depending on various communication protocols such as Institute of Electrical and Electronics Engineers (IEEE), Zigbee, $3^{rd}$ generation (3G), $3^{rd}$ generation partnership project (3GPP), long term evolution (LTE), and the like. The NFC chip refers to a chip operated in an NFC manner using a band of 13.56 MHz among various radio frequency identification (RFID) frequency bands such as 135 kHz, 13.56 MHz, 433 MHz, 860 to 960 MHz, 2.45 GHz, and the like.

The display 140 may display the image in which the noise is removed by the processor 120. In addition, an image before the noise is removed may be displayed on the display 140 according to a design of software such as an application or the like. The display 140 may be implemented by various types of displays such as a liquid crystal display (LCD), an organic light emitting diode (OLED) display, a plasma display panel (PDP), and the like. A driving circuit, a backlight unit, and the like, that may be implemented in a form such as an a-si thin film transistor (TFT), a low temperature poly silicon (LTPS), a TFT, an organic TFT (OTFT), and the like, may be included in the display 140. In addition, the display 140 may be implemented by a flexible display.

Meanwhile, according to diverse embodiments, the display 140 may not be included in the electronic device 100.

The button 150 may be various types of buttons such as a mechanical button, a touch pad, a wheel, and the like, formed in any region such as a front surface portion, a side surface portion, a rear surface portion, and the like, of a body appearance of the electronic device 100.

The video processor 160 is a component for processing video data included in a content received through the communicator 130 or a content stored in the memory 110. In the video processor 160, various types of image processing such as decoding, scaling, noise filtering, frame rate converting, resolution converting, and the like, for the video data may be performed. In this case, the video data may be video data in which noise is removed for each frame by the processor 120.

The camera 170 is a component for capturing a still image or a moving image according to control of the user. Specifically, the camera 170 may include a lens, an image sensor, and the like. In addition, the camera 170 may be implemented by a plurality of cameras such as a front camera and a rear camera. Further, according to diverse embodiments, the camera 170 may not be included in the electronic device 100.

Although not illustrated in FIG. 2, according to an embodiment, a universal serial bus (USB) port to which a USB connector may be connected, a headset, a mouse, various external input ports for connection to various external terminals such as a local area network (LAN), and the like, a digital multimedia broadcasting (DMB) chip receiving and processing a DMB signal, an audio processor, a microphone, an audio output, various sensors, and the like, may be further included in the electronic device 100.

Figure 4:
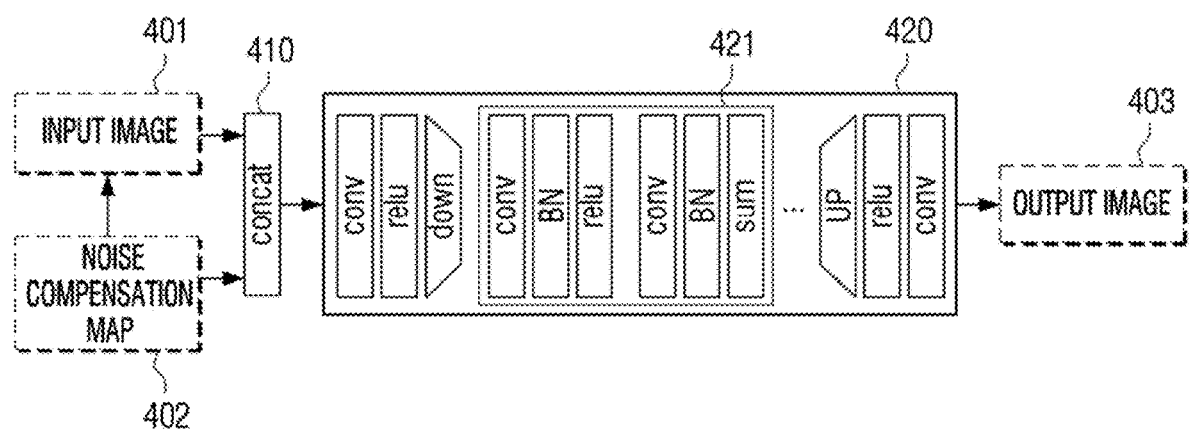
Figure 5:
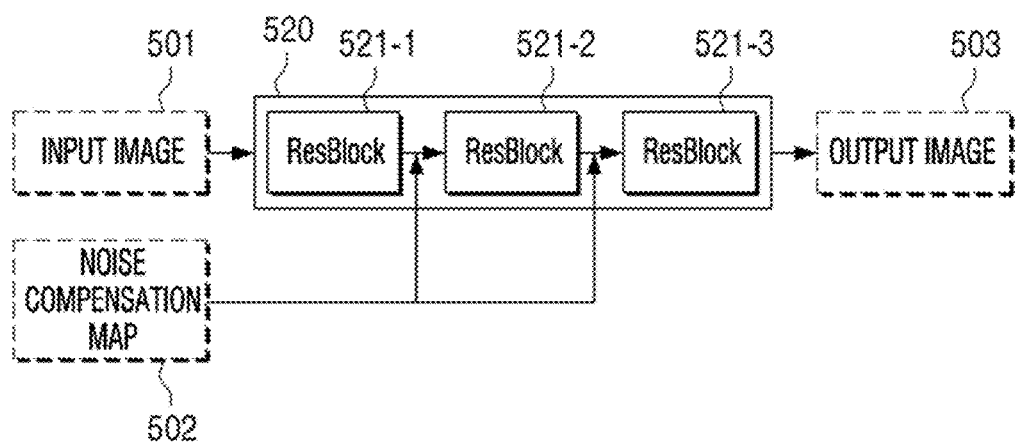

FIGS. 3 to 5 are views for describing a noise compensation process according to diverse embodiments of the disclosure. For convenience of explanation, solid line blocks illustrated in FIGS. 3 to 5 refer to operations performed by at least one processor included in the electronic device, and dotted line blocks illustrated in FIGS. 3 to 5 refer to input data or output data.

Referring to FIG. 3, the electronic device may first obtain brightness information 302 of an input image 301 from the input image 301. Specifically, the electronic device may obtain light and shade information of the input image 301. In this case, the brightness information 302 may be light and shade information for each pixel of the input image 301 or light and shade information for each region divided for each brightness.

In addition, the electronic device may obtain a noise compensation map 304 using at least one of the obtained brightness information 302 or setting information 303 of the camera (310). In this case, the setting information 303 of the camera is information on the camera capturing the input image 301, and may include at least one of lens information or ISO information of the camera.

The electronic device may obtain the noise compensation map 304 based on the brightness information 302. Specifically, the electronic device may obtain the noise compensation map 304 so that the lower the brightness of the image, the higher the noise removal intensity, based on the brightness information 302.

The electronic device may remove noise of the input image 301 using the input image 301 and the noise compensation map 304 (320), and obtain an output image 305 in which the noise is compensated for.

In this case, the electronic device may obtain the output image 305 using the input image 301, the noise compensation map 304, and an artificial intelligence model. Specifically, this will be described in detail with reference to FIGS. 4 and 5.

Referring to FIG. 4, the electronic device may obtain an output image 403 from an input image 401 and a noise compensation map 402. Here, the noise compensation map 402 is obtained using brightness information of the input image 401 as in FIG. 3, and an overlapping description will thus be omitted.

First, the electronic device may concatenate (concat) the input image 401 and the noise compensation map 402 to each other (410). Specifically, the electronic device may mosaic a plurality of images as one image by connecting the plurality of images to each other.

In addition, the electronic device may input the connected image to an artificial intelligence model 420 to remove noise. Specifically, the electronic device may extract a feature of the image while passing the connected image through a convolution (conv) layer. In this case, the connected image may include a plurality of frames, and the electronic device may extract features of each of the plurality of frames.

In addition, the electronic device may selectively pass the connected image through a rectified linear unit (ReLU) layer. A ReLU function is to solve the problem that it becomes impossible to know what influence an input value has on a result value or an influence of an input value on a result value becomes very slight while passing the connected image through a plurality of layers, and is a function of performing processing to represent a value less than 0 as 0 and represent a value greater than 0 in a form of a linear function. As a result, the influence of the input value on the result value may be better observed, such that accurate learning may be possible.

Meanwhile, the electronic device may remove noise of the connected image using a noise removal module 421 for removing the noise of the image. Specifically, the noise removal module 421 includes a plurality of convolution layers, a batch normalization (BN) layer normalizing the extracted feature of the image, a ReLu layer, and the like, and may remove the noise of the connected image by passing the connected image through the plurality of layers.

Meanwhile, the electronic device may selectively reduce the connected image and input the reduced image to the noise removal module 421. As a result, a noise reduction effect may be maximized. Specifically, it has been experimentally confirmed that the electronic device may compress or remove unnecessary information and may more appropriately perform noise removal, by reducing the image.

Meanwhile, a plurality of parameters included in the artificial intelligence model 420 may be parameters trained in advance. Specifically, the electronic device may input a high-definition original image of the input image 401, in addition to the input image 401, which is a noise image, to the artificial intelligence model 420, and may train the parameters of the artificial intelligence model 420 so that the output image 403 in which the noise is removed coincides with the high-definition original image.

Meanwhile, it has been illustrated in FIG. 4 that the input image and the noise compensation map are concatenated to each other and the concatenated image is input to the artificial intelligence model, but a concatenation process may be performed within the artificial intelligence model.

In addition, it has been illustrated in FIG. 4 that the obtained noise compensation map is input to the artificial intelligence model, but only the input image may be input to the artificial intelligence model and the artificial intelligence model may generate the noise compensation map.

An embodiment in which the noise compensation map is input together with the input image to the artificial intelligence model has been described hereinabove, but the noise compensation map may also be input in a noise removal process. This will be described below with reference to FIG. 5.

Referring to FIG. 5, the electronic device may input an input image 501 and a noise compensation map 502 generated based on the input image 501 into an artificial intelligence model 520. In addition, the electronic device may obtain an output image 503 in which noise is compensated for.

In this case, the artificial intelligence model 520 may include a plurality of noise removal modules 521-1, 521-2, and 521-3. Each noise removal module is the same as that illustrated in FIG. 4, and an overlapping description will thus be omitted. In addition, although not illustrated in FIG. 5, also in an embodiment illustrated in FIG. 5, as illustrated in FIG. 4, an operation of concatenating the input image 501 and the noise compensation map 502 to each other and an operation of reducing and enlarging the image before and after the noise removal modules may be performed.

In addition, the electronic device may input the noise compensation map between the plurality of noise removal modules 521-1, 521-2 and 521-3. As a result, a noise reduction effect maximized. Specifically, when an image in which the input image 501 and the noise compensation map 502 are connected to each other passes through a convolution layer, the information of the input image and the noise compensation map are combined with each other to obtain new information, and the noise compensation map 502 is input again in the middle, such that the electronic device may perform noise compensation using more clear information.

Figure 6:
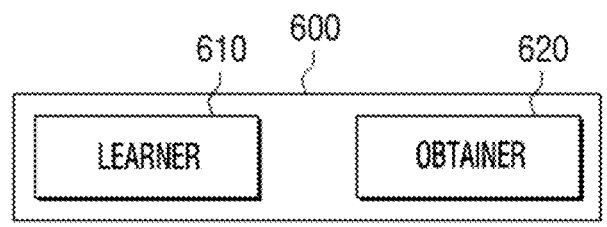
FIG. 6 is a block diagram illustrating a configuration of an electronic device for learning and using an artificial intelligence model according to an embodiment of the disclosure.

FIG. 6 is a block diagram illustrating a configuration of an electronic device for learning and using an artificial intelligence model according to an embodiment of the disclosure.

Referring to FIG. 6, the processor 600 may include at least one of a learner 610 or an obtainer 620. The processor 600 of FIG. 6 may correspond to the processor 120 of the electronic device 100 of FIGS. 1 and 2 or a processor of a data learning server (not illustrated).

The learner 610 may generate or learn a model for removing noise of an image. The learner 610 may generate an artificial intelligence model for removing the noise of the image using collected learning data. The learner 610 may generate a learned model having a noise removal criterion using the collected learning data. Such a learner 610 may correspond to a training set of the artificial intelligence model.

As an example, the learner 610 may generate, learn, or update a model for removing noise using an input image, which is a noise image, and a noise compensation map as input data. Specifically, the learner 610 may generate, learn, or update a model for removing noise of the image based on brightness information of the image. In addition, the learner 610 may learn or update the model so that the input image, which is the noise image, and a high-definition original image corresponding to the input image coincide with each other.

The obtainer 620 may obtain various information using predetermined data as input data of the learned model.

For example, the obtainer 620 may obtain (or recognize, estimate, infer) brightness information of the image or feature information of the image using the input image and the noise compensation map as input data. In addition, the obtainer 620 may obtain information on a noise removal intensity, a pixel value of an image in which noise is removed, and the like, using the obtained brightness information and feature information of the image.

At least some of the learner 610 and at least some of the obtainer 620 may be implemented by software modules or be manufactured in a form of at least one hardware chip and mounted in the electronic device. For example, at least one of the learner 610 or the obtainer 620 may be manufactured in a form of a dedicated hardware chip for artificial intelligence (AI) or may be manufactured as some of an existing general-purpose processor (for example, a CPU or an application processor) or a graphics dedicated processor (for example, a graphics processing unit (GPU)) and be mounted on the various electronic devices described above. In this case, the dedicated hardware chip for artificial intelligence is a dedicated processor specialized in probability calculation, and may quickly process a calculation task in an artificial intelligence field such as machine learning due to higher parallel processing performance than an existing general-purpose processor. In a case where the learner 610 and the obtainer 620 are implemented by the software modules (or program modules including instructions), the software modules may be stored in a non-transitory computer-readable medium. In this case, the software modules may be provided by an operating system (OS) or may be provided by a predetermined application. Alternatively, some of the software modules may be provided by an operating system (OS), and the others of the software modules may be provided by a predetermined application.

In this case, the learner 610 and the obtainer 620 may be mounted in one electronic device, or may be mounted in separate electronic devices, respectively. For example, one of the learner 610 or the obtainer 620 may be included in the electronic device 100 and the other of the learner 610 or the obtainer 620 may be included in an external server. In addition, the learner 610 and the obtainer 620 may communicate with each other in a wired or wireless manner to provide model information configured by the learner 610 to the obtainer 620 and provide data input to the learner 610 to the learner 610 as additional learning data.

Figure 7A:
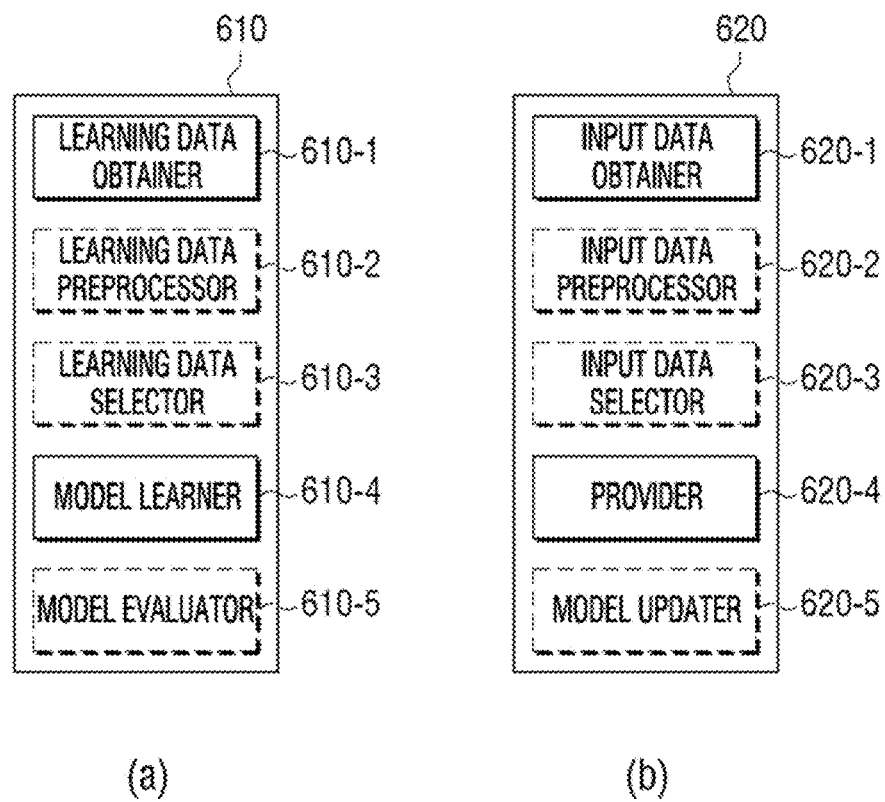
FIGS. 7A and 7B are block diagrams illustrating specific configurations of a learner and an obtainer according to an embodiment of the disclosure.

FIG. 7A is a block diagram of a learner 610 and an obtainer 620 according to diverse embodiments.

Referring to (a) of FIG. 7A, the learner 610 according to some embodiments may include a learning data obtainer 610-1 and a model learner 610-4. In addition, the learner 610 may optionally further include at least one of a learning data preprocessor 610-2, a learning data selector 610-3, or a model evaluator 610-5.

The learning data obtainer 610-1 may obtain learning data required for a model. As an embodiment of the disclosure, the learning data obtainer 610-1 may obtain a compensated image in which noise of an input image is removed, an original image, and the like, as learning data, using the input image, a noise compensation map, and a noise compensation map. The learning data may be data collected or tested by the learner 610 or a manufacturer of the learner 610.

The model learner 610-4 may learn how much to remove noise and how to compensate for a difference between the compensated image and the original image, based on the input image and the noise compensation map, using the learning data. As an example, the model learner 610-4 may learn an artificial intelligence model through supervised learning using at least some of the learning data as a decision criterion. Alternatively, the model learner 610-4 may learn an artificial intelligence model through, for example, unsupervised learning that finds a decision criterion for decision of a situation by performing self-learning using the learning data without separate supervision. In addition, the model learner 610-4 may learn an artificial intelligence model through reinforcement learning that uses feedback on whether or not a result of a situation decision according to learning is correct. In addition, the model learner 610-4 may learn the artificial intelligence model using, for example, a learning algorithm or the like, including an error back-propagation or a gradient descent.

When the artificial intelligence model is learned, the model learner 610-4 may store the learned artificial intelligence model. In this case, the model learner 610-4 may store the learned artificial intelligence model in the memory 110 of the electronic device 100. Alternatively, the model learner 610-4 may also store the learned artificial intelligence model in a memory of a server (for example, an artificial intelligence server) connected to the electronic device 100 through a wired or wireless network.

The learner 610 may further include the learning data preprocessor 610-2 and the learning data selector 610-3 to improve a recognition result of the artificial intelligence model or save a resource or a time required for generating the artificial intelligence model.

The learning data preprocessor 610-2 may preprocess the obtained data so that the obtained data may be used for learning for removing the noise of the image. The learning data preprocessor 610-2 may process the obtained data into a predetermined format so that the model learner 610-4 may use the obtained data for the learning for removing the noise of the image.

The learning data selector 610-3 may select data required for learning among data obtained by the learning data obtainer 610-1 or data preprocessed by the learning data preprocessor 610-2. The selected learning data may be provided to the model learner 610-4. The learning data selector 610-3 may select the learning data required for the learning among the obtained or preprocessed data according to a predetermined selection criterion. In addition, the learning data selector 610-3 may select the learning data according to a predetermined selection criterion by learning by the model learner 610-4.

The learner 610 may further include the model evaluator 610-5 to improve a recognition result of the artificial intelligence model.

The model evaluator 610-5 may input evaluation data to the artificial intelligence model, and may allow the model learner 610-4 to again learn the artificial intelligence model in a case where a recognition result output from the evaluation data does not satisfy a predetermined criterion. In this case, the evaluation data may be predefined data for evaluating the artificial intelligence model.

For example, the model evaluator 610-5 may evaluate that the learned artificial intelligence model does not satisfy a predetermined criterion in a case where the number or a ratio of evaluation data from which recognition results are not accurate exceeds a predetermined threshold value among recognition results of the learned artificial intelligence model for the evaluation data.

Meanwhile, in a case where there are a plurality of learned artificial intelligence models, the model evaluator 610-5 may evaluate whether or not the respective learned artificial intelligence models satisfy a predetermined criterion, and determine a learned artificial intelligence model satisfying the predetermined criterion as a final artificial intelligence model. In this case, in a case where the number of learned artificial intelligence models satisfying the predetermined criterion is plural, the model evaluator 610-5 may determine any one predetermined learned artificial intelligence model or a predetermined number of learned artificial intelligence models as a final data recognition model in descending order of an evaluation score.

Referring to (b) of FIG. 7A, the obtainer 620 according to some embodiments may include an input data obtainer 620-1 and a provider 620-4.

In addition, the obtainer 620 may optionally further include at least one of an input data preprocessor 620-2, an input data selector 620-3, or a model updater 620-5.

The input data obtainer 620-1 may obtain brightness information in the input image, and obtain a noise compensation map for compensating for the noise of the input image based on the brightness information of the input image and setting information of a camera. The provider 620-4 may apply the input data obtained by the input data obtainer 620-1, as an input value, to the learned artificial intelligence model to obtain a compensated image from which the noise is removed. The provider 620-4 applies data selected by an input data preprocessor 620-2 or the input data selector 620-3 to be described later, as an input value, to the artificial intelligence model to obtain a compensated image in which the noise is removed.

As an example, the provider 620-4 may apply the input image and the noise compensation map obtained by the input data obtainer 620-1 to the learned artificial intelligence model to obtain (or estimate) a compensated image in which the noise is removed.

The obtainer 620 may further include the input data preprocessor 620-2 and the input data selector 620-3 to improve a recognition result of the artificial intelligence model or save a resource or a time for providing the recognition result.

The input data preprocessor 620-2 may preprocess the obtained data so that the obtained data may be used to be input to first and second models. The input data preprocessor 620-2 may process the obtained data into a predefined format so that the provider 620-4 may use the obtained data to remove the noise of the input image.

The input data selector 620-3 may select data required for situation decision among data obtained by the input data obtainer 620-1 or data preprocessed by the input data preprocessor 620-2. The selected data may be provided to the provider 620-4. The input data selector 620-3 may select some or all of the obtained or preprocessed data according to a predetermined selection criterion for the situation decision. In addition, the input data selector 620-3 may select the data according to a predetermined selection criterion by the learning by the model learner 610-4.

The model updater 620-5 may perform control so that the data recognition model is updated based on evaluation of the recognition result provided by the provider 620-4. For example, the model updater 620-5 may provide the compensated image provided by the provider 620-4 to the model learner 610-4 to request the model learner 610-4 to additionally learn or update the artificial intelligence model.

Figure 7B:
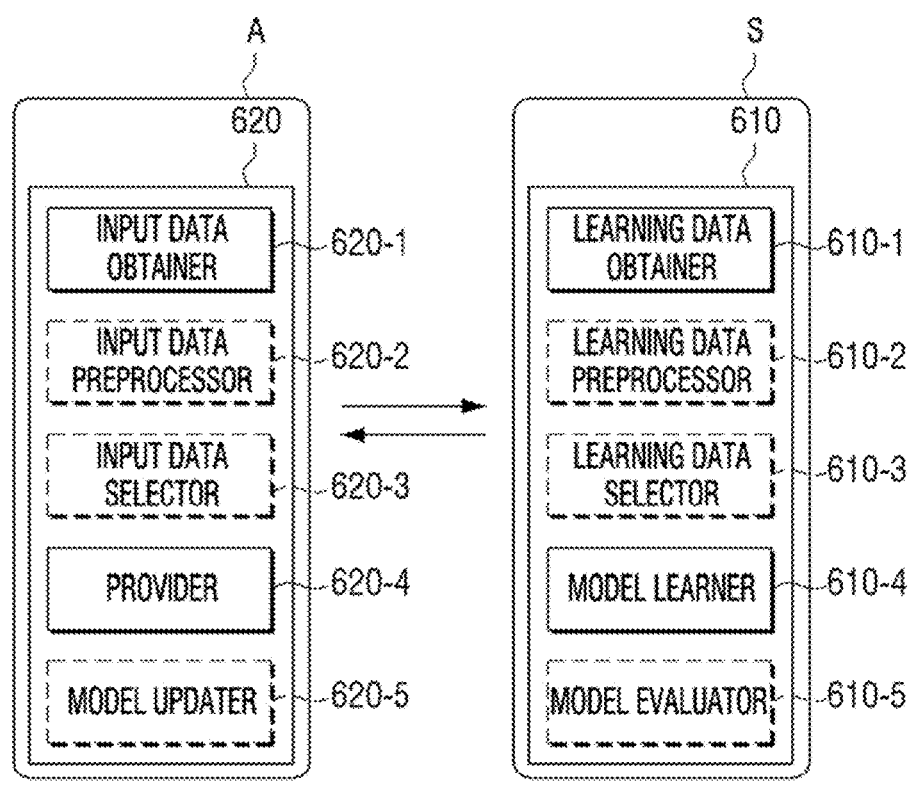

FIG. 7B is a view illustrating an example in which an electronic device A according to an embodiment and an external server S interwork with each other to learn and decide data.

Referring to FIG. 7B, the external server S may obtain information on an input image and a noise compensation map corresponding to the input image and learn a criterion for removing noise of the input image, and the electronic device A may obtain a compensated image in which noise of the input image is removed, using models generated based on a learning result by the server S.

In this case, a model learner 610-4 of the server S may perform a function of the learner 610 illustrated in FIG. 6.

The model learner 610-4 of the server S may learn a decision criterion (or a recognition criterion) for an artificial intelligence model.

In addition, a provider 620-4 of the electronic device A may apply data selected by an input data selector 620-3 to the artificial intelligence model generated by the server S to obtain a compensated image in which the noise of the input image is removed. Alternatively, the provider 620-4 of the electronic device A may receive the artificial intelligence model generated by the server S from the server S, and obtain a compensated image in which the noise of the input image is removed, using the received artificial intelligence model.

FIG. 8 is a view for explaining a process of obtaining a noise compensation map according to an embodiment of the disclosure.

Referring to FIG. 8, the electronic device may obtain a gray map 802 including brightness information of an input image (test image) 801 from the input image 801. In this case, the brightness information may include light and shade information of the image.

For example, the electronic device may obtain the gray map of the image based on the following Equation 1.

$$graymap = 1 - \frac{Im(gray)}{255} \quad (1)$$

Here, Im(gray) refers to a light and shade value of a Pixel of the image, and may have one value of 0 to 255.

In addition, the electronic device may obtain a vignetting map 803 using lens information among setting information of a camera capturing the input image 801. For example, the vignetting is generated at corners of the image, and the electronic device may thus generate the vignetting map 803 based on positions of pixels included in the image.

Specifically, the electronic device may obtain a distance between a target pixel and a center pixel as in Equation (2).

$$Distance=(x-cx)^2+(y-cy)^2 \quad (2)$$

Here, (x,y) is a position of the target pixel, and (cx, cy) is a position of the center pixel.

In addition, the electronic device may obtain the vignetting map 803 using a ratio of the distance obtained from Equation (2) and a maximum distance as in Equation (3).

$$vig.map=Distance/Maximum\ distance \quad (3)$$

Here, the maximum distance is a distance between the center pixel and a pixel positioned at the farthest distance, and may refer to a distance between a center pixel and a pixel of the corner of the image. That is, the electronic device may obtain the vignetting map 803 so that the larger the distance of the target pixel from the center pixel, the higher the noise removal intensity.

In addition, the electronic device may overlap the obtained gray map 802 and the vignetting map 803 with each other to obtain a noise compensation map 804. In this case, the electronic device may obtain the noise compensation map 804 further using ISO information among the setting information of the camera.

In addition, the electronic device may overlap the obtained gray map 802 and the vignetting map 803 with each other to obtain a noise compensation map 804. In this case, the electronic device may obtain the noise compensation map 804 further using ISO information among the setting information of the camera.

As an example, the electronic device may obtain the noise compensation map 804 using Equation (4).

$$\text{Noise compensation map} = 255 * \frac{iso}{\max(iso)} * (0.5 * vig.\text{map} + 0.5 * graymap) \quad (4)$$

Here, max(iso) refers to a maximum ISO value of the camera capturing the input image 801, and iso refers to an ISO value when the input image 801 is captured. That is, the electronic device may obtain the noise compensation map so that the higher the ISO value at the time of capturing the input image 801, the higher the noise removal intensity.

Meanwhile, it has been described hereinabove that the gray map 802 and the vignetting map 803 overlap with each other in the same ratio, but the disclosure is not limited thereto.

FIG. 9 is a view for describing an embodiment of a noise compensation map obtained by reflecting setting information of a camera.

First, an input image 901 input for noise removal may include a vignetting phenomenon, as illustrated in (a) of FIG. 9. Specifically, outer portions or corners of the input image 901 may become dark or be covered with black. This may appear because outer portions of a lens of a camera are covered with a hood, a filter or the like when the hood, the filter or the like is mounted at a front portion of the lens. Alternatively, due to a problem of the lens itself, an image of light passing through the lens is shorter than a diagonal length of a photographed screen, such that vignetting may be generated at corner portions of the screen. That is, different vignetting may be generated for each lens of the camera capturing the input image 901 or for each mounted hood or filter.

Therefore, the electronic device may obtain a vignetting map 902 as illustrated in (b) of FIG. 9 using lens information of the camera capturing the input image 901 or hood or filter information. Referring to (b) of FIG. 9, the vignetting map 902 may be generated in a form for compensating for the vignetting of the input image 901. Specifically, four corner portions of the input image 901 are dark to have a large amount of noise, and the electronic device may thus generate the vignetting map 902 so that a noise removal intensity of the four corners of the input image 901 becomes high.

Figure 10:
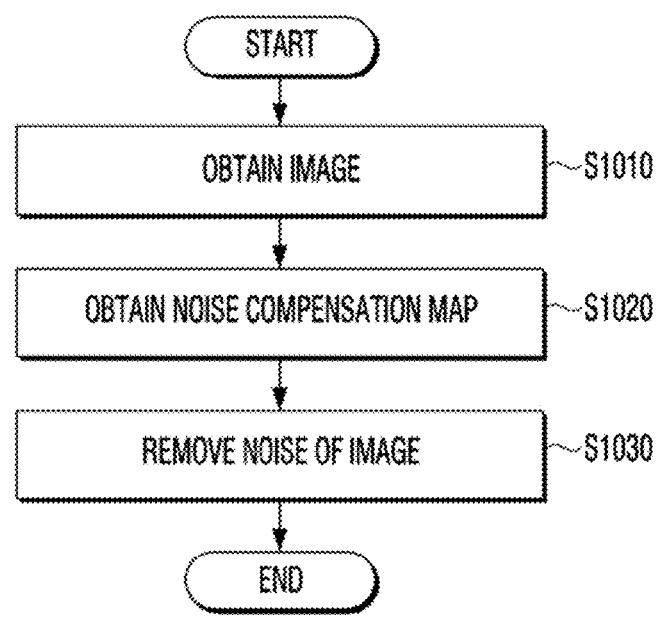
FIG. 10 is a flowchart for describing an image compensation method according to an embodiment of the disclosure.

FIG. 10 is a flowchart for describing an image compensation method according to an embodiment of the disclosure.

First, the electronic device may obtain an image (S1010). Specifically, when the electronic device is provided with a camera, the electronic device may obtain an image using the camera. Meanwhile, the electronic device may also receive an image captured by an external camera.

Then, the electronic device may obtain a noise compensation map (S1020). Specifically, the electronic device may obtain a noise compensation map using brightness information of the image and setting information of the camera. For example, the electronic device may obtain a noise compensation map using at least one of light and shade information of the image, lens information of the camera, or ISO information of the camera.

Then, the electronic device may remove noise of the image (S1030). Specifically, the electronic device may remove noise of an input image using the noise compensation map. In this case, the electronic device may input the input image and the noise compensation map to an artificial intelligence model and output a compensated image in which noise is removed. Here, parameters included in the noise compensation map may be parameters learned in advance.

In a training process, the electronic device may train parameters of the artificial intelligence model using the input image, which is a noise image, and a high-definition original image corresponding to the input image. Specifically, the electronic device may train the parameters of the artificial intelligence model so that the compensated image in which the noise of the input image is removed and the high-definition original image coincide with each other, using the noise compensation map of the input image.

After the training is sufficiently performed, in a test process, the electronic device may remove the noise of the input image using the trained parameters.

Figure 11:
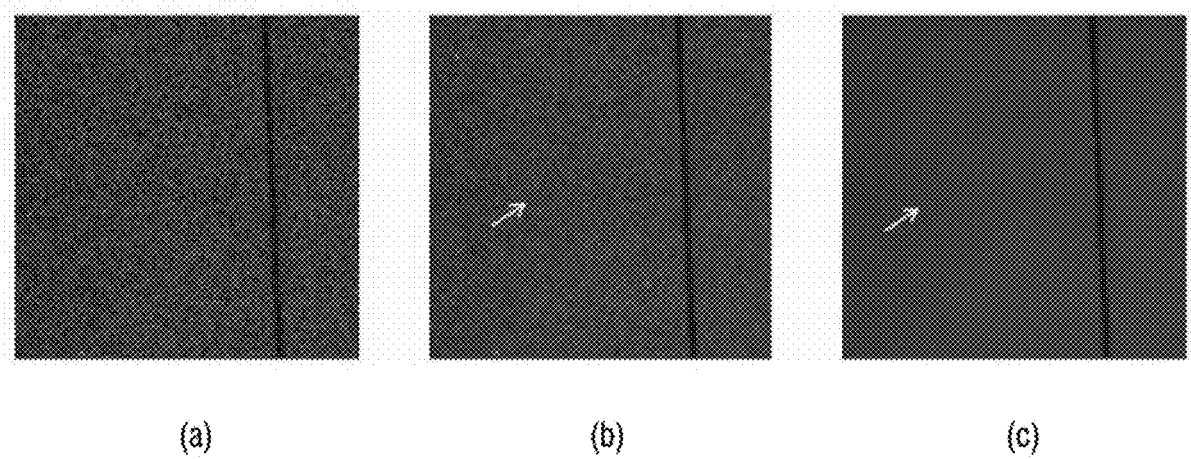
FIG. 11 is a view for comparing an existing image and an image compensated according to the disclosure with each other.

FIG. 11 is a view for comparing an existing image and an image compensated according to the disclosure with each other. Specifically, (a) of FIG. 11 is an input image on which compensation is not performed, (b) of FIG. 11 is a compensated image obtained by the related art, and (c) of FIG. 11 is a compensated image obtained according to an embodiment of the disclosure.

(b) of FIG. 11 is a compensated image obtained in a case of inputting only an input image, which is a noise image, to an artificial intelligence model for removing noise. The artificial intelligence model in (b) of FIG. 11 was learned to remove Gaussian noise, and noise of the input image was removed as a whole, but the image was not locally handled. Therefore, in a particularly dark region within the image, the noise may not be sufficiently removed and a texture of the image may be lost.

On the other hand, (c) of FIG. 11 is a compensated image obtained in a case of generating a noise compensation map corresponding to an input image and inputting the noise compensation map and the input image together to an artificial intelligence model according to the disclosure, and it may be confirmed from (c) of FIG. 11 that a noise removal effect is more excellent than that of (b) of FIG. 11 and a texture of the image is preserved.

Meanwhile, the diverse embodiments described above may be implemented in a computer or a computer-readable recording medium using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described in the specification may be implemented by the processor 120 itself. According to a software implementation, embodiments such as procedures and functions described in the specification may be implemented by separate software modules. Each of the software modules may perform one or more functions and operations described in the specification.

Meanwhile, the image processing method according to the diverse embodiments of the disclosure described above may be stored in a non-transitory readable medium. The non-transitory readable medium may be mounted and used in various devices.

The non-transitory computer readable medium is not a medium that stores data for a while, such as a register, a cache, a memory, or the like, but means a medium that semi-permanently stores data and is readable by an apparatus. In detail, programs for performing the diverse methods described above may be stored and provided in the non-transitory readable medium such as a compact disc (CD), a digital versatile disc (DVD), a hard disc, a Blu-ray disc, a universal serial bus (USB), a memory card, a read only memory (ROM), or the like.

According to an embodiment, the method according to the diverse embodiments disclosed in the disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Although embodiments of the disclosure have been illustrated and described hereinabove, the disclosure is not limited to the specific embodiments described above, but may be variously modified by those skilled in the art to which the disclosure pertains without departing from the gist of the disclosure as claimed in the claims. These modifications should be understood to fall within the scope and spirit of the disclosure.

The invention claimed is:

1. An electronic device, comprising:
a memory including at least one command; and
a processor, connected to the memory, configured to control the electronic device,
wherein the processor when executing the at least one command, is configured to:
obtain an image and a vignetting map based on lens information of a camera,
obtain a noise compensation map for compensating for noise of the image by overlapping a gray map of the image and the vignetting map with each other, and
remove the noise of the image through the noise compensation map.

2. The electronic device as claimed in claim 1, wherein the processor is configured to obtain the noise compensation map so that a noise removal intensity becomes high in a region in which brightness is low, based on brightness information of the image.

3. The electronic device as claimed in claim 2, wherein the brightness information of the image is light and shade information for each pixel of the image, and
the processor is configured to obtain the noise compensation map so that the noise removal intensity varies for each pixel.

4. The electronic device as claimed in claim 2, wherein the processor is configured to divide the image into a plurality of regions for each brightness and obtain the noise compensation map so that the noise removal intensity varies for each divided region.

5. The electronic device as claimed in claim 1, wherein the processor is configured to obtain setting information of the camera that includes at least one of the lens information of the camera or ISO information of the camera.

6. The electronic device as claimed in claim 5, wherein the processor is configured to obtain the noise compensation map so that a noise removal intensity varies according to a vignetting compensation degree, based on the lens information of the camera.

7. The electronic device as claimed in claim 5, wherein the processor is configured to obtain the noise compensation map so that a higher ISO value corresponds to a higher noise removal intensity, based on the ISO information.

8. The electronic device as claimed in claim 1, wherein the processor is configured to input the noise compensation map and the image to a learned artificial intelligence model to obtain a compensated image in which the noise is removed.

9. An image processing method of an electronic device, comprising:
obtaining an image and a vignetting map based on lens information of a camera;
obtaining a noise compensation map for compensating for noise of the image by overlapping a gray map of the image and the vignetting map with each other; and
removing the noise of the image through the noise compensation map.

10. The image processing method as claimed in claim 9, wherein the obtaining of the noise compensation map comprises obtaining noise compensation map so that a noise removal intensity becomes high in a region in which brightness is low, based on brightness information of the image.

11. The image processing method as claimed in claim 10, wherein the brightness information of the image is light and shade information for each pixel of the image, and
wherein the obtaining of the noise compensation map comprises obtaining the noise compensation map so that the noise removal intensity varies for each pixel.

12. The image processing method as claimed in claim 11, wherein the obtaining of the noise compensation map comprises dividing the image into a plurality of regions for each brightness and obtaining the noise compensation map so that the noise removal intensity varies for each divided region.

13. The image processing method as claimed in claim 9, further comprising obtaining setting information of the camera that includes at least one of the lens information of the camera or ISO information of the camera.

14. The image processing method as claimed in claim 13, wherein the obtaining of the noise compensation map comprises obtaining the noise compensation map so that a noise removal intensity varies according to a vignetting compensation degree, based on the lens information of the camera.

15. The image processing method as claimed in claim 13, wherein the obtaining of the noise compensation map comprises obtaining the noise compensation map so that a higher ISO value corresponds to a higher noise removal intensity, based on the ISO information.

* * * * *